United States Patent [19] [11] 3,769,586

Shapiro et al. [45] Oct. 30, 1973

[54] HYBRID COUPLER FOR RADIO TRANSMITTER HAVING PARALLEL OUTPUT AMPLIFIER STAGES

[75] Inventors: Jonas M. Shapiro, Fairfield, Conn.; Joel Julie, Bronxville, N.Y.

[73] Assignee: Litton Systems, Inc., Beverly Hills, Calif.

[22] Filed: Apr. 26, 1971

[21] Appl. No.: 137,339

[52] U.S. Cl. .......... 325/157, 325/105, 330/30 R

[51] Int. Cl. .......... H04b 7/02

[58] Field of Search .......... 325/125, 128, 129, 325/150, 156, 157, 158, 178, 179, 180; 343/207, 208, 180; 333/11, 25; 330/14, 31, 124, 30 R; 336/173

[56] References Cited

UNITED STATES PATENTS

| | | | |
|---|---|---|---|
| 3,406,352 | 10/1968 | Gardenghi | 330/31 |
| 3,388,337 | 6/1968 | Lee | 330/31 X |
| 3,437,931 | 4/1969 | Schultz | 325/178 X |
| 2,602,887 | 7/1952 | Brown | 325/128 |
| 3,385,974 | 5/1968 | Rockwell | 343/208 X |
| 3,424,983 | 1/1969 | Schilb | 325/178 X |
| 3,517,317 | 6/1970 | Sire | 325/128 |
| 3,182,268 | 5/1965 | Burwen | 330/30 R X |
| 3,284,637 | 11/1966 | Berry | 330/30 R |
| 3,319,088 | 5/1967 | Payne | 330/30 R X |
| 3,471,796 | 10/1969 | Wright | 330/30 R |

*Primary Examiner*—Benedict V. Safourek
*Attorney*—M. Michael Carpenter, Alan C. Rose and Alfred B. Levine

[57] ABSTRACT

A hybrid coupling means to couple a plurality of parallel output amplifier stages of a radio transmitter or the like to an antenna or load circuit. A two-port combining hybrid is used to combine the power output of two parallel transistor amplifiers to supply a single power output to the load, while preventing damage to one amplifier if the other amplifier becomes open or short-circuited. A pi-section filter network connected between the hybrid coupling means and the antenna protects the amplifier in case the antenna is accidentally short-circuited or disconnected.

6 Claims, 1 Drawing Figure

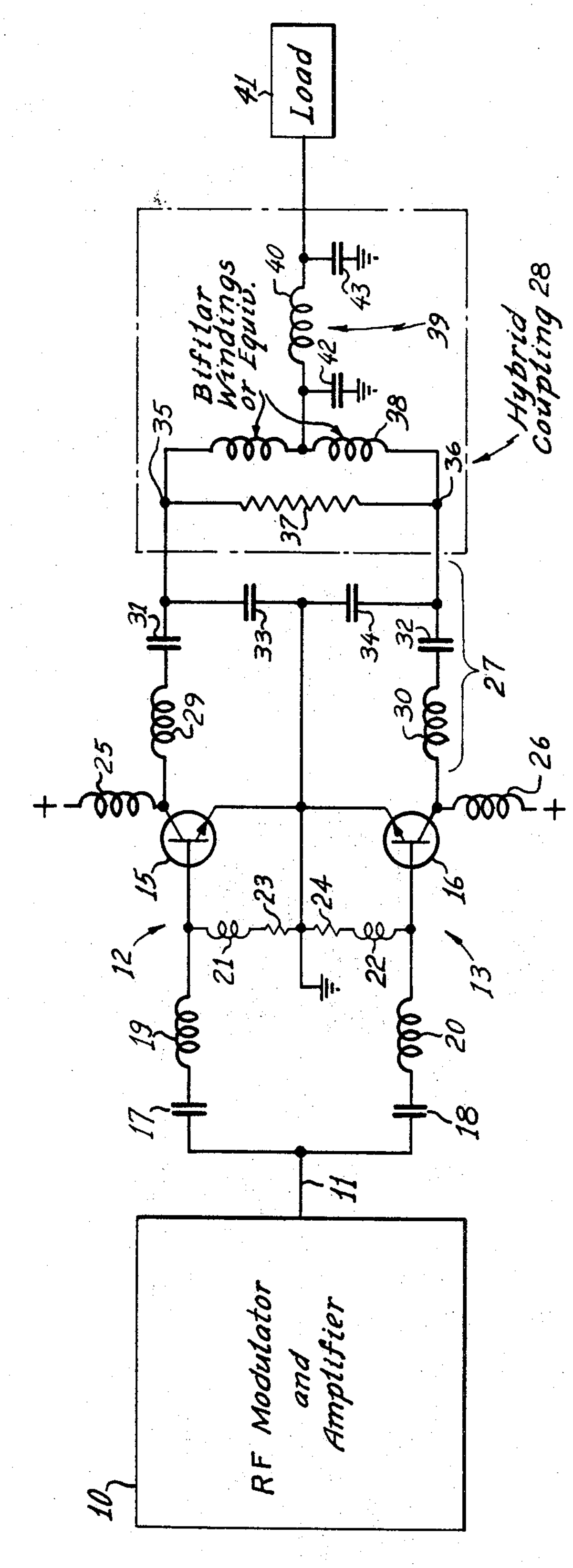
Load
41
Bifilar Windings or Equiv.
Hybrid coupling 28
RF Modulator and Amplifier
10
11
12
13
15
16
17
18
19
20
21
22
23
24
25
26
27
29
30
31
32
33
34
35
36
37
38
39
40
42
43

HYBRID COUPLER FOR RADIO TRANSMITTER HAVING PARALLEL OUTPUT AMPLIFIER STAGES

BACKGROUND OF THE INVENTION

The invention relates to radio transmitters and the like and, more particularly, to an arrangement for protecting the components of an amplifier stage when one of the associated amplifiers therein becomes open or short-circuited or the impedance of the antenna circuit drastically changes. Normally, under these conditions, the amplifier would be damaged by an over-voltage or over-current condition caused thereby.

BRIEF SUMMARY OF INVENTION

In systems utilizing radio frequency energy, such as radio transmitters, parallel output transistor amplifiers are commonly used to obtain the required output power level. When one amplifier fails in such systems, any remaining parallel amplifier is often damaged. The amplifiers are also damged if the antenna circuit is accidentally opened or short-circuited. This difficulty is overcome in accordance with the present invention by using a hybrid coupling device to couple the transmitter output stages to the antenna or load circuit, and a pi-section filter network to isolate the output stages from the detrimental effects of changes in the impedance of the antenna. The hybrid coupling element provides very high isolation of the parallel amplifier stages while exhibiting almost no attenuation between the amplifiers and the antenna. When one transistor amplifier burns out, any remaining transistor continues to function and complete shutdown of the transmitter is avoided.

An object of the invention in general terms is to protect a radio transmitter against the usual deleterious effects of a failure of a transistor amplifier when connected in parallel with another amplifier and also to protect against the effect of a change in the antenna or load circuit impedance.

BRIEF DESCRIPTION OF DRAWING

The invention is illustrated in the accompanying FIGURE which shows a preferred embodiment thereof.

BRIEF DESCRIPTION OF THE INVENTION

Referring to the drawing, a typical circuit embodying the invention in a radio transmitter is shown by way of example. The radio transmitter includes an RF modulator and amplifier 10 connected through a conductor 11 to two parallel transistor amplifier circuits 12 and 13 including transistor amplifiers 15 and 16. Clearly, further parallel amplifiers circuits may be utilized. The use of two or more parallel transistor amplifiers has the drawback that ordinarily the failure or burn out of one transistor will damage any remaining parallel transistor. In order to avoid this possibility, the invention contemplates the isolation of the parallel transistor amplifiers.

As shown, the parallel amplifier circuits 12 and 13 include series capacitors 17 and 18 having one electrode each connected to the conductor 11 and each second electrode thereof connected respectively to the first terminal or inductors 19 and 20. The second terminal of inductor 19 connects to the base of the transistor 15 and also serially connected through an inductor 21 and a resistor 23 to a source of common potential, such as ground. The inductor 20 has its second terminal connected to the base of the transistor 16 while further being connected serially through an inductor 22 and a resistor 24 to the source of common potential. The transistor amplifiers 15 and 16, as shown by way of example, are of the NPN type with their collector electrodes respectively connected to a source of positive potential through inductors 25 and 26. The emitters of each transistor amplifier 15 and 16 are connected to the source of common potential. Obviously, any equivalent transistor amplifiers may be substituted in the transmitter circuit.

In order to prevent damage to one of the parallel amplifier circuits should the other develop a short circuit, the amplifiers are connected through a low impedance coupling circuit 27 to a hybrid coupling device 28. The low impedance coupling circuit 27 serves to isolate the amplifiers while offering negligible attenuation to the output power from the amplifier output stages. The low impedance coupling circuit 27 includes inductors 29 and 30 serially connecting the collector electrodes of each transistor amplifier 15 and 16 respectively to one electrode of series capacitors 31 and 32. The second electrode of each capacitor 31 and 32 is shunted to the source of common potential by shunting capacitors 33 and 34 while also being connected to input terminals 35 and 36 of the hybrid coupling device 28.

The hybrid coupling device 28 is preferably shunted by a resistor 37 of relatively low resistance connected between terminals 35 and 36, for example of the order of 100 or 200 ohms. The hybrid coupling means 28 includes an output coil 38 having bifilar windings with each end connected to the terminals 35 and 36 and the center tap thereof connected to a pi-section filter network 39. The bifilar coil winding 38 may be considered as inductances connected in a series aiding relation. That is, each inductance coil of the bifilar winding is subject to a substantially equal current flow in opposite directions there through. The side-by-side relationship of the bifilar coils causes the magnetic fields generated by the oppositely flowing current to cancel each other, thus creating a low inductance within each coil. The pi-section filter network 39 includes an inductor 40 serially connected between the center tap of the bifilar windings 30 and an antenna or load circuit 41. A first capacitor 42 shunts the end of the inductor 40 connected to the center tap of the bifilar windings 30 to a source of common potential, while a second capacitor 43 shunts the opposite end thereof to the common potential.

When the power level of the transmitter output stages is large, a length of coaxial cable may be substituted for the bifilar transformer windings 38 with the interconnection of the coaxial conductors being the same as in the bifilar coil construction. If one of the transmitter amplifiers 12 or 13 developes a short circuit or other failure within the embodiment thus described, the magnetic field generated by the bifilar wound coil within the other amplifier circuit will no longer be cancelled by the field from the first inductance coil. This will cause the inductance of the operating inductor to increase thereby protecting the amplifier circuit in which it operates from an over-voltage or over-current condition. This amplifier circuit remains operative and it is unnecessary to shut down the transmitter.

In accordance with a further feature of the invention, the output impedance of the hybrid coupling device 28 is matched to the impedance of the antenna or load circuit 41 by a pi-section filter network 39 instead of the usual coupling transformer. This effectively isolates the amplifier stages 15 and 16 from drastic changes in the impedance of the load circuit as for example it being caused by an open or short circuit.

In a radio transmitter, the invention prevents disruption of service if one of the transistors fails and insures that the output stages will not be damaged if one transmitter amplifier fails or the antenna is open or short circuited.

The embodiments of the invention in which an exclusive property or privilege is claimed are defined as follows:

1. A radio transmitter, comprising:
   - a source of radio frequency energy;
   - antenna means;
   - a plurality of parallel output amplifier means having input and output terminals with said input terminals connected to said source of radio frequency energy;
   - a plurality of low impedance coupling means connected to said out terminals of said plurality of parallel output amplifier means;
   - hybrid coupling means including a hybrid transformer having two inductively coupled windings connected to a common central terminal and wound in series aiding relation with opposing ends each connected to one of said plurality of low impedance coupling means for isolating each amplifier means from the other while offering negligible attenuation to the outputs therefrom; and
   - filter means connected between said common central terminal of said hybrid coupling means and said antenna means to protect against damage to said amplifier means upon the occurrence of an open or short circuit within said antenna means.

2. A radio transmitter according to claim 1, additionally comprising resistance means connected across said opposing ends of said two inductively coupled windings.

3. A radio transmitter according to claim 1, in which said two inductively coupled windings of said hybrid transformer of said hybrid coupling means consists of a length of coaxial cable.

4. A radio transmitter according to claim 1, in which said two inductively coupled windings of said hybrid transformer of said hybrid coupling means consists of bifilar windings.

5. A radio transmitter according to claim 4, in which said filter means includes pi-section filter means connected from said common central terminal of said hybrid transformer windings to said antenna means.

6. A radio transmitter, comprising:
   - a source of radio frequency energy having an output terminal;
   - two parallel transistor output amplifier stages each having output and input terminals with said input terminals connected to said output terminal of said source of radio frequency energy;
   - hybrid coupling means including two bifilar wound inductance coils with an opposite end of each of said bifilar wound coils connected to an output terminal of said parallel amplifier stages and the other end of each of said bifilar wound coils commonly connected to a common central terminal wherein a transformer coupling between each of said bifilar wound coils forms a balanced circuit having low attenuation to current flow from both amplifier stages; and
   - an antenna connected to said common central terminal to receive said current flow wherein said bifilar wound inductance coils isolate said parallel amplifier stages and maintain current flow when one stage fails.

* * * * *